Figures 1, 2, 3:
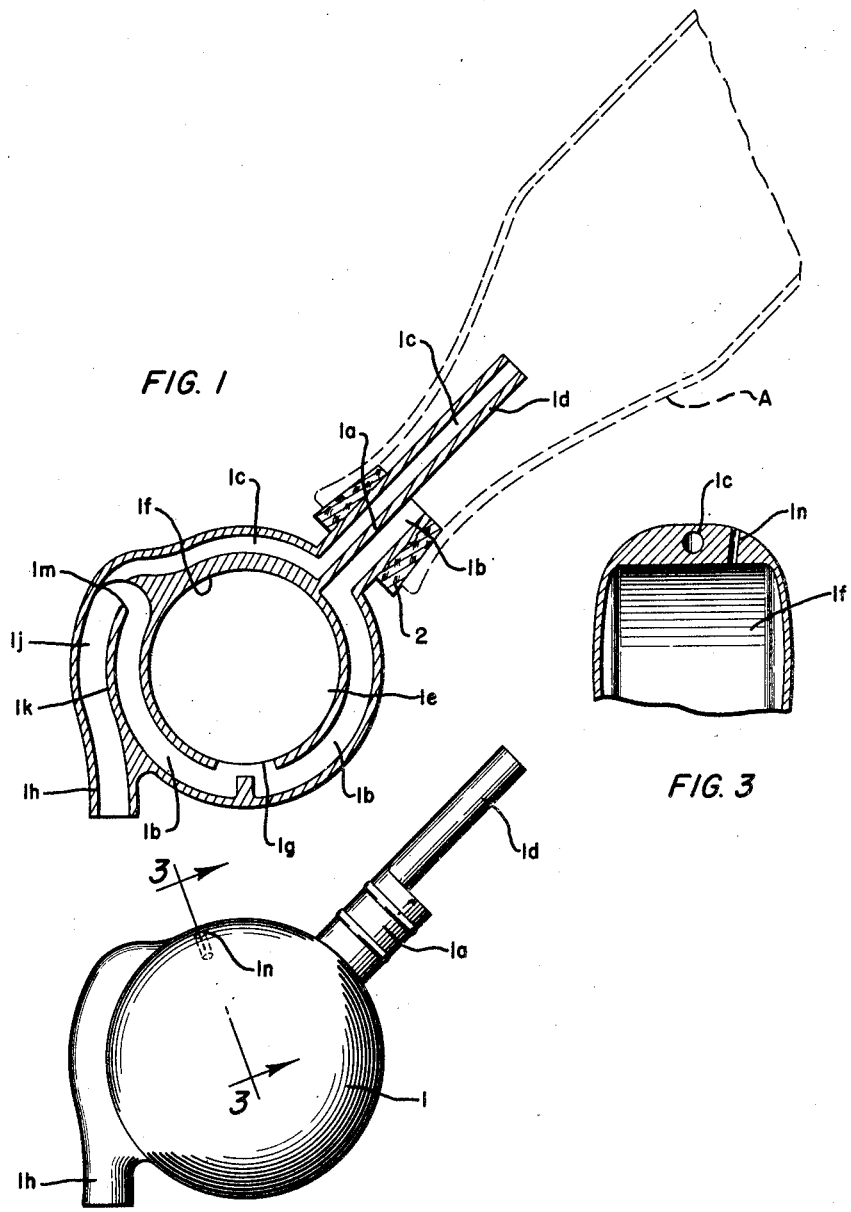

March 27, 1951 W. C. KELLER 2,546,188
PERIODIC SIPHON METERING DEVICE FOR BOTTLES
Filed May 13, 1946

INVENTOR.
WILLIAM C. KELLER
BY
A. B. Bowman
ATTORNEY

Patented Mar. 27, 1951

2,546,188

UNITED STATES PATENT OFFICE 2,546,188

PERIODIC SIPHON METERING DEVICE FOR BOTTLES

William C. Keller, Del Mar, Calif.

Application May 13, 1946, Serial No. 669,381

6 Claims. (Cl. 222—71)

My invention relates to a liquid metering device for bottles and the objects of my invention are:

First, to provide a liquid metering device for bottles, which automatically dispenses intermittently measured quantities of fluid from an inverted fluid container;

Second, to provide a liquid metering device for bottles of this class which may be used in connection with soft drink bottles or other beverage containing bottles for pouring the beverage into a plurality of glasses whereby the liquid containing bottle may be inverted and held in the inverted position during the pouring operating in filling a plurality of glasses, while the liquid is dispensed through said metering device in measured quantities intermittently, providing a time element intermediate each quantity dispensation for movement of the metering device from one glass to the other;

Third, to provide a liquid metering device for bottles of this class which may be readily secured in connection with various conventional bottles;

Fourth, to provide a liquid metering device of this class which is very accurate in its measured dispensation of liquid;

Fifth, to provide a liquid metering device for bottles of this class which is particularly useful in dispensing measured quantities of various liquors; and Sixth, to provide a liquid metering device of this class which is very simple and economical of construction, efficient in operation, and which will not readily deteriorate or get out of order.

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application in which:

Figure 1 is a longitudinally sectional view of my liquid metering device, showing by dash lines a bottle in connection therewith; Fig. 2 is a side elevational view of my liquid metering device; and Fig. 3 is a fragmentary sectional view taken from the line 3—3 of Fig. 2.

Similar characters of reference refer to similar parts and portions throughout the several views of the drawings.

The casing 1 and the gasket 2 constitute the principal parts and portions of my liquid metering device for bottles.

The casing 1 is provided with a neck portion 1a having a liquid outlet passage 1b and an air inlet passage 1c defined by an extending tubular portion 1d, adapted to extend a considerable distance into the bottle A as shown by dash lines in Fig. 1 of the drawings. The casing 1 is provided with a substantially circular casing portion 1e in which the metering reservoir portion 1f is outlined by arcuate portions of the passages 1b and 1c. Communicating with the metering reservoir portion 1f and the fluid outlet passage 1b is the port 1g. Integral with the casing 1 is a pouring spout portion 1h having a partition portion 1k terminating substantially on a level with the upper side of the dispensing reservoir portion 1f at its edge portion 1m. The air inlet portion 1c communicates with the passage portion 1j of the pouring spout 1h above the partition portion 1k. The spout passage portion 1j communicates with the outlet passage 1b at the upper edge 1m of the partition portion 1k. Communicating with the dispenser reservoir portion 1f and atmosphere externally of the casing 1, is the port 1n, as shown best in Figs. 2 and 3 of the drawings. It will be noted that the liquid dispensing reservoir portion 1f is substantially circular in form and that the air inlet passage portion 1c and liquid outlet passage portion 1d are substantially arcuately disposed about the liquid metering reservoir portion 1f providing a very compact liquid dispensing device. The pouring spout portion 1h is disposed in substantially tangential relationship with the dispensing reservoir portion 1f. Positioned around the neck portion 1a of the casing 1 is an annular gasket 2, which is preferably made of cork or other suitable material, adapted to fit the inner portion of a conventional bottle neck as shown by dash lines A in Fig. 1 of the drawings.

The operation of my liquid metering device for bottles is substantially as follows:

When the bottle A, as shown in Fig. 1 of the drawings, is inverted, liquid passes downwardly through the outlet passage portion 1b, while air passes upwardly through the pouring spout passage portion 1j and air inlet passage portion 1c. As the liquid passes downwardly through the passage portion 1b, it transfers through the port 1g, into the dispensing reservoir portion 1f. As the liquid level rises in the reservoir portion 1f it reaches the level corresponding to the upper edge portion 1m of the partition portion 1k, whereupon the reservoir portion 1f is substantially filled and liquid starts to spill over the upper edge 1m of the partition 1k and passes downwardly through the passage 1j of the pouring spout 1h. As the liquid reaches volume flow in the passage portion 1j, the air passing through the air inlet passage 1c is shut off, causing a partial vacuum to be created in the bottle A, above the liquid level therein. As this partial vacuum builds to a certain value, the flow of liquid through the liquid outlet passage 1b is stopped, and the liquid remaining in the dispensing reservoir portion 1f is siphoned over the upper edge 1m of the partition 1k. After the remaining liquid has been siphoned through the passage 1j of the pouring spout 1h, the liquid flow stops momentarily until sufficient air passes through the air inlet passage 1c to relieve the partial vacuum in the bottle A, whereupon liquid again resumes flow through the liquid outlet passage 1b and starts to refill the dispensing reservoir portion 1f. The intermittent time interval between liquid dispensations is controlled by the rate of flow of the liquid in filling up the dispensing reservoir 1f after the partial vacuum in the bottle A has been relieved by resumption of air flow through the air inlet passage 1c. It will be noted that during the filling operation of the dispensing reservoir portion 1f by liquid traveling downwardly through the liquid outlet passage 1b, that air in the dispensing reservoir portion 1f is relieved through the air relief port 1n, as shown best in Figs. 2 and 3 of the drawings, permitting the liquid level to rise readily in the liquid dispensing reservoir portion 1f, and also permitting the liquid to be siphoned readily therefrom through the passage 1j of the liquid pouring spout 1h.

Though I have shown and described a particular construction, combination and arrangement of parts and portions, I do not wish to be limited to the particular construction, combination, and arrangement, but desire to include in the scope of my invention, the construction, combination and arrangement substantially as set forth in the appended claims.

Having thus described my invention, what I claim as new and desire to secure by Letters Patent is:

1. In a liquid metering device, a unitary casing in pouring position having a neck provided with means for securing the same to a liquid container, said neck having a pair of passages therethrough, one of said passages being a liquid outlet passage adapted to drain liquid from the container to which the metering device is connected, the other passage being adapted to conduct air into the container, said metering device having an enlarged body portion in connection with said neck, provided with a central reservoir portion having an opening in its lowermost portion, a passage from said liquid outlet passage in said neck portion extending downwardly around the lower side of said reservoir and communicating with the openings in the lower portion thereof, and extending upwardly to a position near the upper extremity of the inside of said reservoir in opposed relationship to said fluid outlet passage in said neck portion, said metering device having a substantially vertically disposed pouring spout communicating at its upper end with the upper end of said last-mentioned passage, in opposed relationship to the fluid outlet passage in said neck portion, said metering device provided with an air transfer passage communicating with the upper end of said pouring spout and the air inlet passage in said neck portion, and air vent means communicating with the interior of said reservoir at the uppermost inner portion thereof, and extending externally of said metering device.

2. In a liquid metering device of the class described, the combination of a unitary casing in pouring position, said casing having a centrally disposed reservoir therein, provided with partition means surrounding the same, and having an opening in the lowermost extremity thereof, said casing having a neck provided with a pair of passages therein, one of said passages extending around the lower side of said reservoir and communicating with said opening in the lower portion thereof, the liquid inlet end of said last-mentioned passage being near the level of the upper portion internally of said reservoir, the opposite end of said last-mentioned passage being on the opposite side of said reservoir from said neck portion and extending to an elevation near the upper inner side of said reservoir, said casing having a pouring spout communicating with said last-mentioned passage at its upper end, opposed to said neck portion and extending downwardly, said casing provided with an air transfer passage communicating with the upper end of said spout at its connection with said last-mentioned passage, and communicating with the other of said passages in said neck portion.

3. In a liquid metering device of the class described, the combination of a unitary casing in pouring position, said casing having a centrally disposed reservoir therein, provided with partition means surrounding the same, and having an opening in the lowermost extremity thereof, said casing having a neck provided with a pair of passages therein, one of said passages extending around the lower side of said reservoir and communicating with said opening in the lower portion thereof, the liquid inlet end of said last-mentioned passage being near the level of the upper portion internally of said reservoir, the opposite end of said last-mentioned passage being on the opposite side of said reservoir from said neck portion and extending to an elevation near the upper inner side of said reservoir, said casing having a pouring spout communicating with said last-mentioned passage at its upper end, opposed to said neck portion and extending downwardly, said casing provided with an air transfer passage communicating with the upper end of said spout at its connection with said last-mentioned passage, and communicating with the other of said passages in said neck portion, said air transfer passage extending over the upper side of said reservoir.

4. In a liquid metering device of the class described, the combination of a unitary casing in pouring position, said casing having a centrally disposed reservoir therein, provided with partition means surrounding the same, and having an opening in the lowermost extremity thereof, said casing having a neck provided with a pair of passages therein, one of said passages extending around the lower side of said reservoir and communicating with said opening in the lower portion thereof, the liquid inlet end of said last-mentioned passage being near the level of the upper portion internally of said reservoir, the opposite end of said last-mentioned passage being on the opposite side of said reservoir from said neck portion and extending to an elevation near the upper inner side of said reservoir, said casing having a pouring spout communicating with said last-mentioned passage at its upper end, opposed to said neck portion and extending downwardly, said casing provided with an air transfer passage communicating with the upper end of said spout at its connection with said last-mentioned passage, and communicating with the other of said passages in said neck portion, said air transfer passage extending over the upper side of said reservoir, air vent means extending from the inside of said reservoir to the outside of said casing at the upper portion of said reservoir.

5. In a liquid metering device of the class described, the combination of a unitary casing in pouring position, a neck for said casing having a container liquid outlet passage therein, and an air inlet passage therein, said casing having a reservoir substantially centrally thereof, having an opening at the lower extremity thereof, said container liquid outlet passage extending downwardly around the lower side of said reservoir and communicating with the opening in the lower side thereof, and extending upwardly at its opposite end from said neck to a level near the upper inner side of said reservoir, a pouring spout communicating with the upper end of said container liquid outlet passage in opposed relation to said neck at the opposite side of said reservoir therefrom, and extending downwardly, an air transfer passage above said liquid reservoir, communicating with said pouring spout and said air inlet passage of said neck.

6. In a liquid metering device of the class described, the combination of a unitary casing in pouring position, a neck for said casing having a container liquid outlet passage therein, and an air inlet passage therein, said casing having a reservoir substantially centrally thereof, having an opening at the lower extremity thereof, said container liquid outlet passage extending downwardly around the lower side of said reservoir and communicating with the opening in the lower side thereof, and extending upwardly at its opposite end from said neck to a level near the upper inner side of said reservoir, a pouring spout communicating with the upper end of said container liquid outlet passage in opposed relation to said neck at the opposite side of said reservoir therefrom, and extending downwardly, an air transfer passage above said liquid reservoir, communicating with said pouring spout and said air inlet passage of said neck, a baffle in said container liquid outlet passage at the middle of said opening in the lower side of said reservoir.

WILLIAM C. KELLER.

REFERENCES CITED

The following references are of record in the file of this patent:

UNITED STATES PATENTS

| Number | Name | Date |
| --- | --- | --- |
| 2,193,043 | Schneider | Mar. 12, 1940 |

FOREIGN PATENTS

| Number | Country | Date |
| --- | --- | --- |
| 115,296 | Australia | June 8, 1942 |
| 572,070 | France | Feb. 14, 1924 |